United States Patent
Takizawa

(10) Patent No.: US 7,044,272 B2
(45) Date of Patent: May 16, 2006

(54) APPARATUS FOR RETAINING A BICYCLE DISK BRAKE ROTOR TO A BICYCLE WHEEL HUB

(75) Inventor: Shinichi Takizawa, Izumisano (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/905,244

(22) Filed: Dec. 22, 2004

(65) Prior Publication Data
US 2005/0139431 A1 Jun. 30, 2005

(30) Foreign Application Priority Data
Dec. 26, 2003 (JP) .............................. 2003-433961

(51) Int. Cl.
*B62L 5/00* (2006.01)
(52) U.S. Cl. .................. 188/26; 188/17; 188/18 A; 301/26; 301/110.5
(58) Field of Classification Search ............. 301/110.5; 188/26, 218 R, 218 XL, 17, 18 A
See application file for complete search history.

(56) References Cited

U.S. PATENT DOCUMENTS

| 6,371,252 | B1* | 4/2002 | Kanehisa | 188/26 |
| 6,854,569 | B1* | 2/2005 | Chen | 188/26 |
| 2004/0182654 | A1 | 9/2004 | Chen | |
| 2004/0200674 | A1* | 10/2004 | Campbell | 188/26 |

FOREIGN PATENT DOCUMENTS

| DE | 20305039 | * | 6/2003 |
| EP | 1288117 A2 | | 3/2003 |
| TW | 553085 | | 9/2003 |
| WO | WO 2004/088162 | * | 10/2004 |

* cited by examiner

*Primary Examiner*—Devon Kramer
(74) *Attorney, Agent, or Firm*—James A. Deland

(57) ABSTRACT

An apparatus for fixing a bicycle disk brake rotor a bicycle wheel hub comprises an adapter and a rotor retaining member. The adapter is structured to be nonrotatably coupled to the bicycle wheel hub and to nonrotatably support a disk brake rotor. The adapter includes at least one insertion opening. The rotor retaining member has a latching member structured to be inserted into the insertion opening in the adapter to retain the disk brake rotor to the adapter.

23 Claims, 13 Drawing Sheets

APPARATUS FOR RETAINING A BICYCLE DISK BRAKE ROTOR TO A BICYCLE WHEEL HUB

BACKGROUND OF THE INVENTION

The present invention is directed to bicycles and, more particularly, to an apparatus for retaining a bicycle disk brake rotor to a bicycle wheel hub.

Cycling has gained widespread acceptance not only as a means of transportation but also as a form of recreation. In fact, both amateur and professional bicycle racing has become extremely popular. As a result of these factors, the bicycle industry is constantly making improvements to various bicycle parts, whether they are used in bicycles for recreation, transportation, or racing. Bicycle braking systems in particular have undergone wide-ranging redesigns over the past few years.

Several types of bicycle braking devices are available on the market. Such devices include rim brakes, caliper brakes, disk brakes, and other general bicycle braking devices. Disk brake systems usually are the braking systems of choice when the rider requires a very high-performance braking system. That is because disk brake systems confer a very large amount of control relative to the force of operation applied to the brake lever, and they generally are very robust under any weather or riding condition.

Disk brake systems normally comprise a caliper connected to the bicycle frame, a brake lever attached to the bicycle handlebar for operating the caliper, and a disk brake rotor securely connected to the bicycle wheel hub. Several different methods are used for connecting the disk brake rotor to the wheel hub. A common method is to bolt the disk brake rotor to an adapter using, e.g., three to eight bolts, wherein the adapter is attached to the wheel hub. Of course, such a method requires each bolt to be attached and tightened separately, thus requiring significant effort during the manufacturing process and degrading manufacturing efficiency.

SUMMARY OF THE INVENTION

The present invention is directed to various features of a bicycle disk brake apparatus. In one embodiment, an apparatus for fixing a bicycle disk brake rotor to a bicycle wheel hub comprises an adapter and a rotor retaining member. The adapter is structured to be nonrotatably coupled to the bicycle wheel hub and to nonrotatably support a disk brake rotor. The adapter includes at least one insertion opening. The rotor retaining member has a latching member structured to be inserted into the insertion opening in the adapter to retain the disk brake rotor to the adapter. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
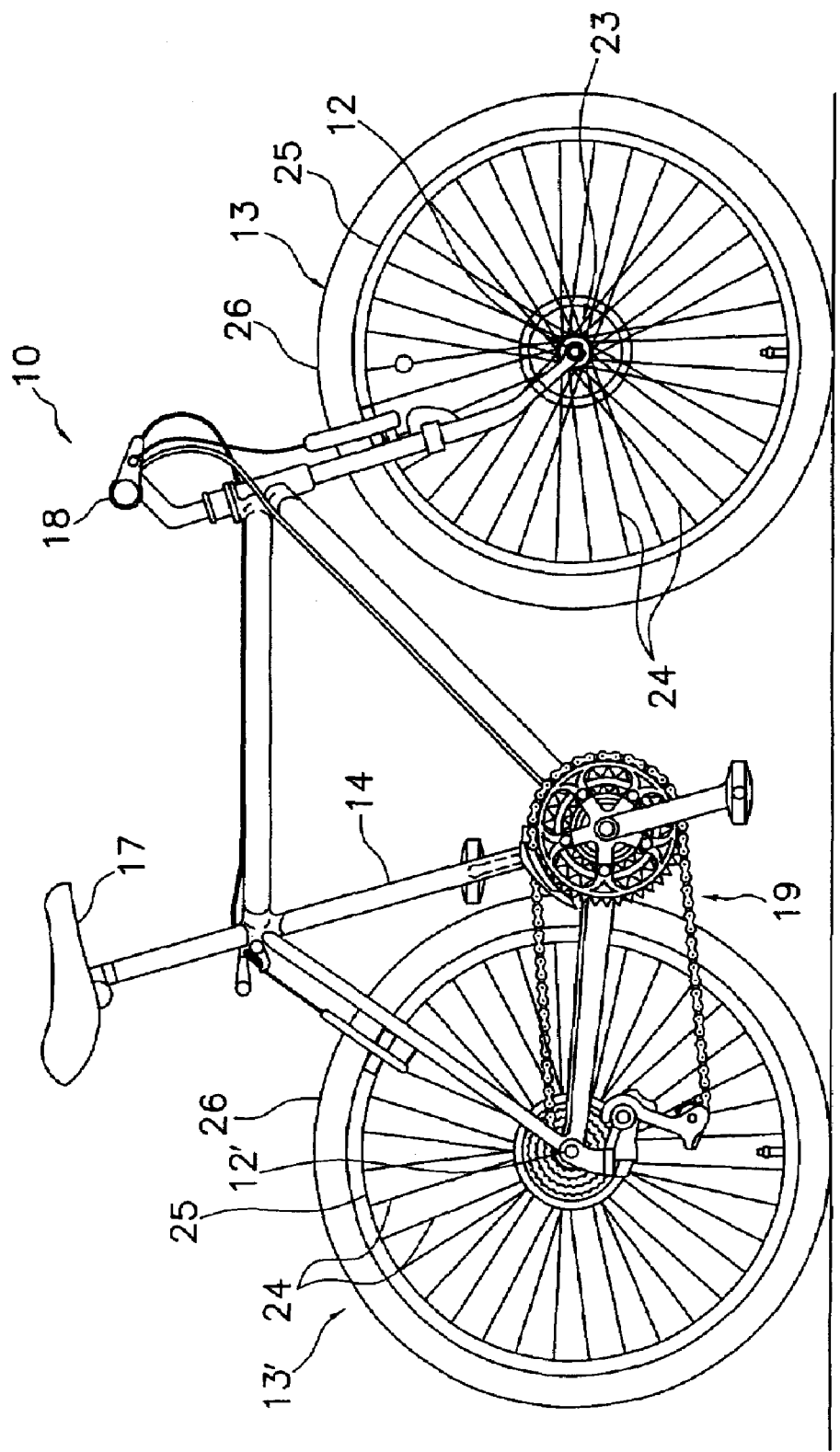
FIG. 1 is a side view of a particular embodiment of a bicycle.

FIG. 1 is a side view of a particular embodiment of a bicycle 10. Bicycle 10 comprises a frame 14, a front wheel 13 rotatably connected to a front fork of frame 14 through a front disk brake hub 12, a rear wheel 13' rotatably connected to the rear portion of frame 14 through a rear disk brake hub 12', a seat 17 adjustably connected to frame 14, handlebars 18 connected to the front fork for rotating front wheel 13, and a drive train 19 for propelling the bicycle 10. A plurality of spokes 24 extend outwardly from the front and rear disk brake hubs 12 and 12', wherein the outer ends of spokes 24 are fastened to a rim 25 with spoke nipples (not shown) in a conventional manner. A tire 26 is disposed on the outer circumference of each rim 25. Bicycle 10 and its various parts are well known, so a description thereof shall be omitted, except for the components comprising the front and rear disk brake hubs 12 and 12'. Other components such as other brakes, derailleurs, additional sprockets, etc. may be used with bicycle 10.

Figure 2:
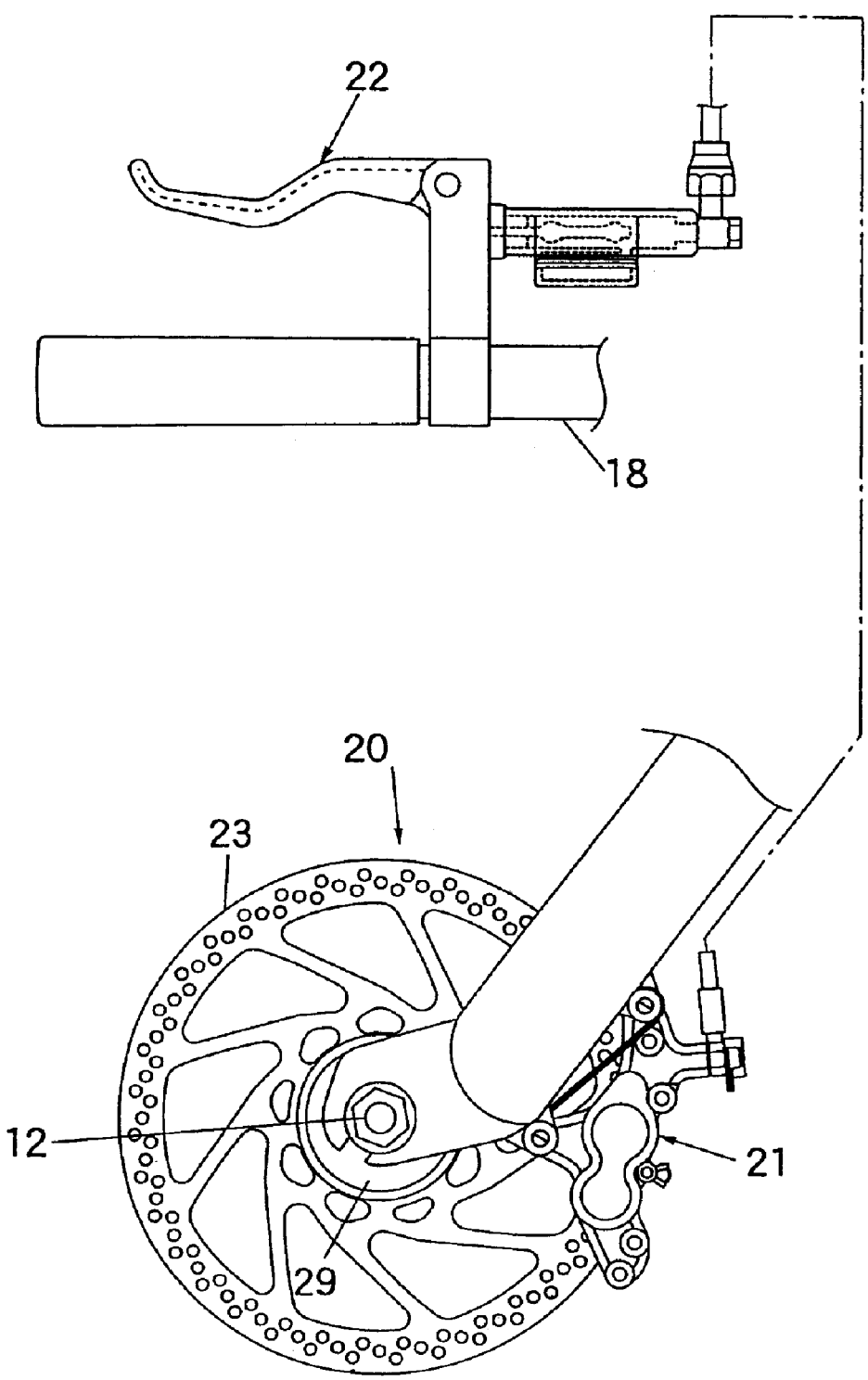
FIG. 2 is a view of relevant components for a front disk brake system.
Figure 3:
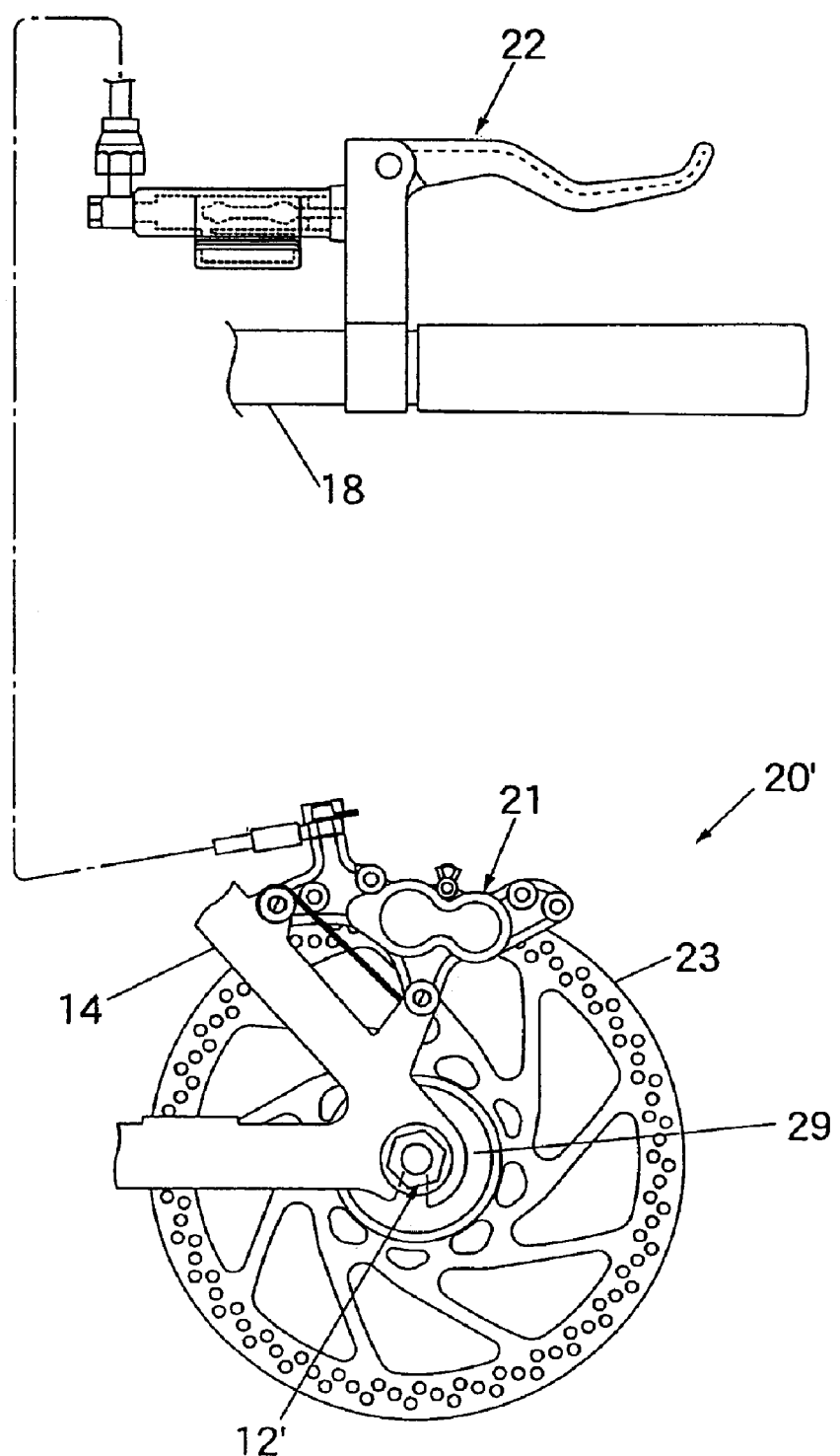
FIG. 3 is a view of relevant components for a rear disk brake system.

As shown in FIGS. 2 and 3, bicycle 10 further comprises front and rear disk brake assemblies 20 and 20', respectively. Each disk brake assembly 20 and 21' comprises a caliper 21 mounted to the front fork or frame 14, respectively, a brake lever 22 mounted to handlebar 18, and a disk brake rotor 23 mounted to its associated hub 12 or 12'. Since the disk brake assemblies 20 and 20' are substantially the same, only the relevant components of disk brake assembly 20 shall be described further.

Figure 4:
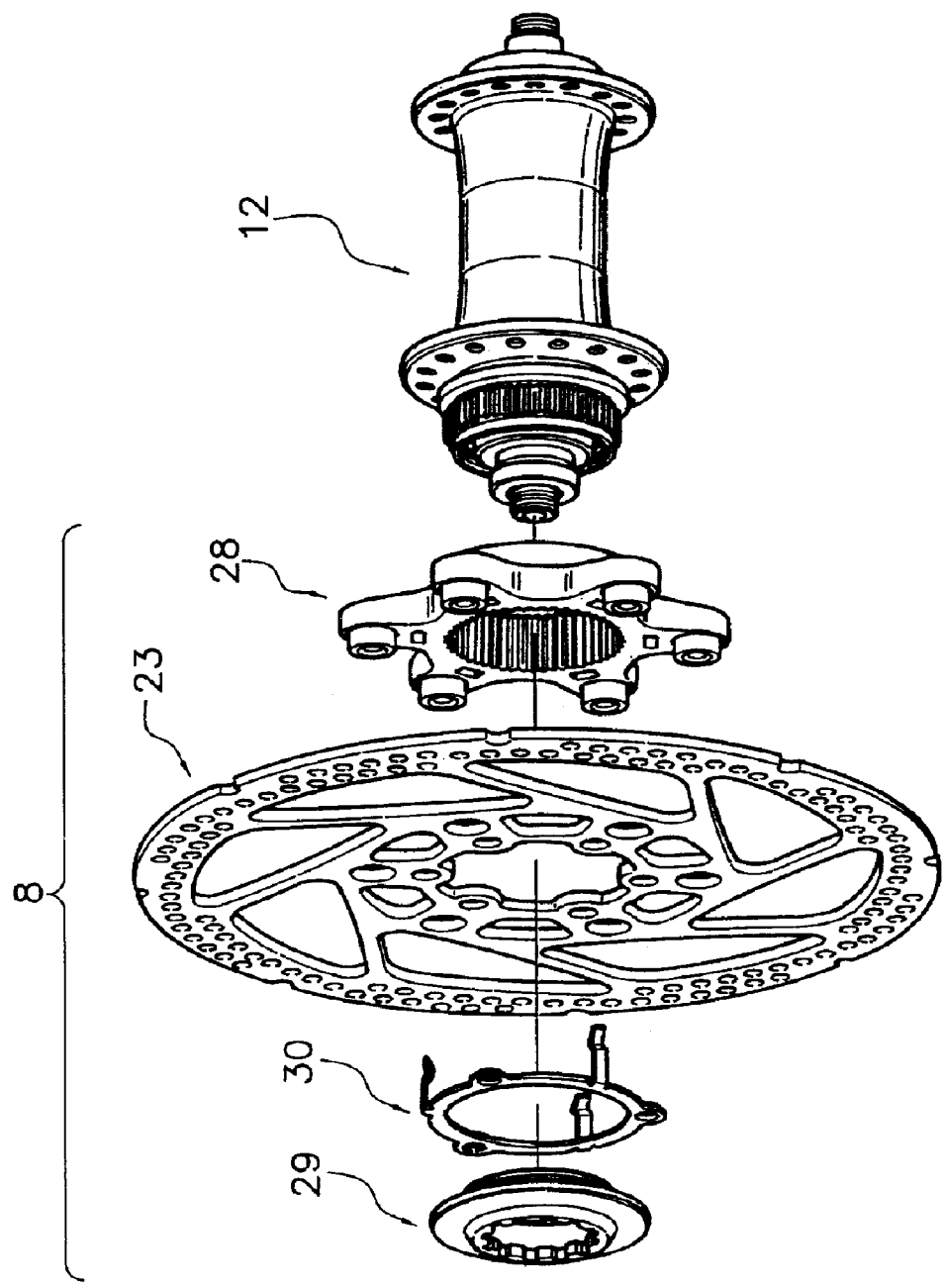
FIG. 4 is an exploded view of particular embodiments of disk brake components associated with a wheel hub.

FIG. 4 is an exploded view of particular embodiments of disk brake components associated with wheel hub 12. In general, disk brake rotor 23 is detachably and nonrotatably connected to disk brake hub 12 using an adapter in the form of a rotor attachment boss 28, a fastener in the form of a securing ring 29, and a rotor retaining member 30. Disk brake rotor 23, rotor attachment boss 28, securing ring 29 and rotor retaining member 30 comprise a disk brake rotor assembly 8. As discussed in more detail below, rotor retaining member 30 retains disk brake rotor 23 to adapter 28 using a finger pressing operation without requiring rivets, bolts or tools.

Figure 5:
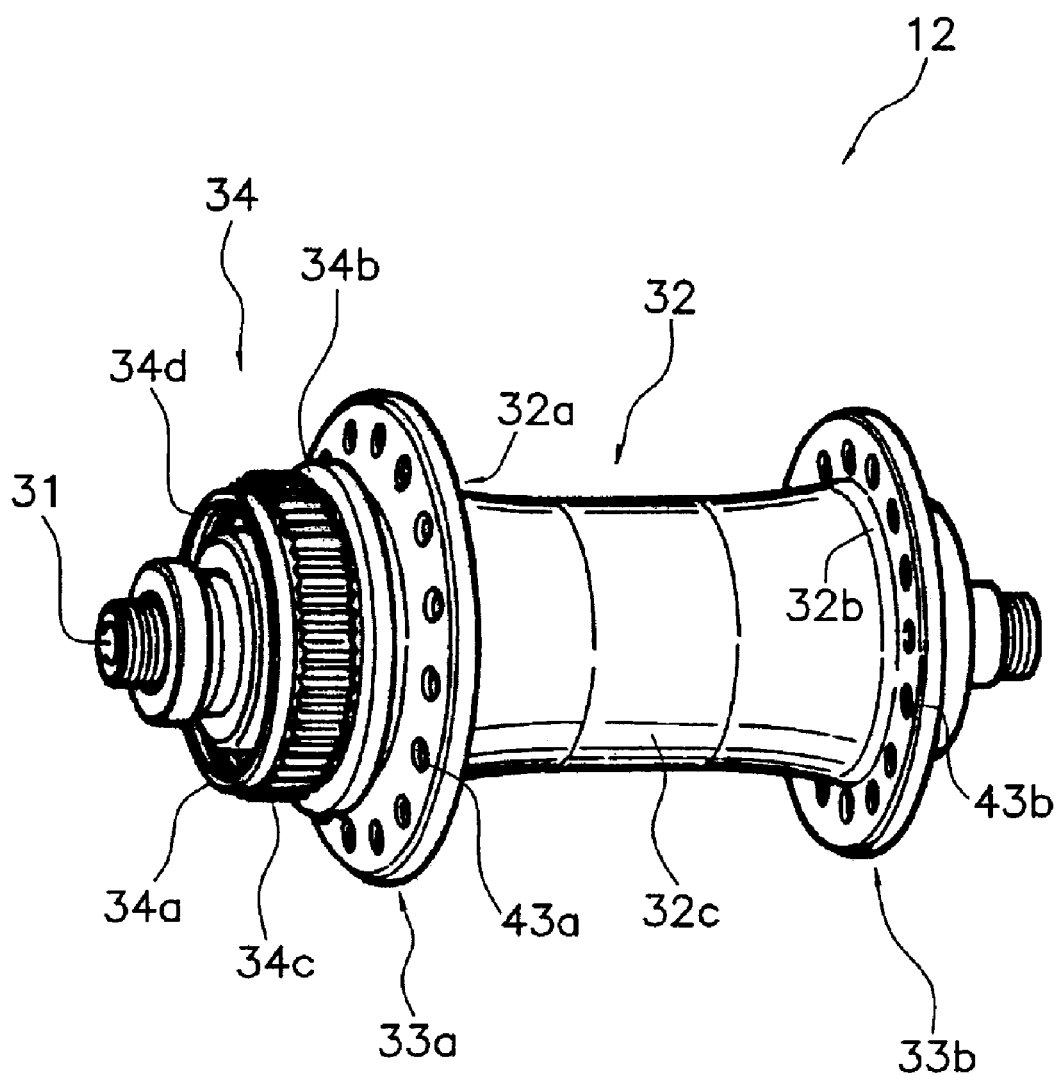
FIG. 5 is a more detailed view of the wheel hub shown in FIG. 4.

Front disk brake hub 12 is nearly identical to the rear disk brake hub 12' except that it lacks a freewheel. As shown in FIG. 5, disk brake hub 12 comprises a hub axle 31, a hub shell 32 rotatably supported on hub axle 31 in a conventional manner, a first spoke connecting flange 33a, a second spoke connecting flange 33b, and a brake rotor attachment unit 34.

First and second spoke connecting flanges 33*a* and 33*b* and brake rotor attachment unit 34 are formed as a unified part with hub shell 32.

First spoke connecting flange 33*a* is an annular spoke flange disposed on hub shell 32 at a first hub shell end 32*a* of hub shell 32. A plurality of first spoke openings 43*a* are formed circumferentially equidistant in first spoke connecting flange 33*a* for receiving the curved ends of each of a plurality of the spokes 24. Similarly, second spoke connecting flange 33*b* is an annular spoke flange disposed on hub shell 32 at a second hub shell end 32*b* of hub shell 32. A plurality of second spoke openings 43*b* are formed circumferentially equidistant in second spoke connecting flange 33*b* for receiving the curved ends of each of another plurality of spokes 24. As a result, the spokes 24 extend radially outwardly in a circumferential manner.

Brake rotor attachment unit 34 is disposed at first hub shell end 32*a* of hub shell 32 adjacent to first spoke connecting flange 33*a*. Brake rotor attachment unit 34 comprises a tubular member 34*a* and an annular adjoining flange 34*b* extending radially outwardly from tubular member 34*a*. Tubular member 34*a* has an outer peripheral surface defining a plurality of male splines 34*c* and an inner peripheral surface defining a female threaded portion 34*d*.

Figure 6:
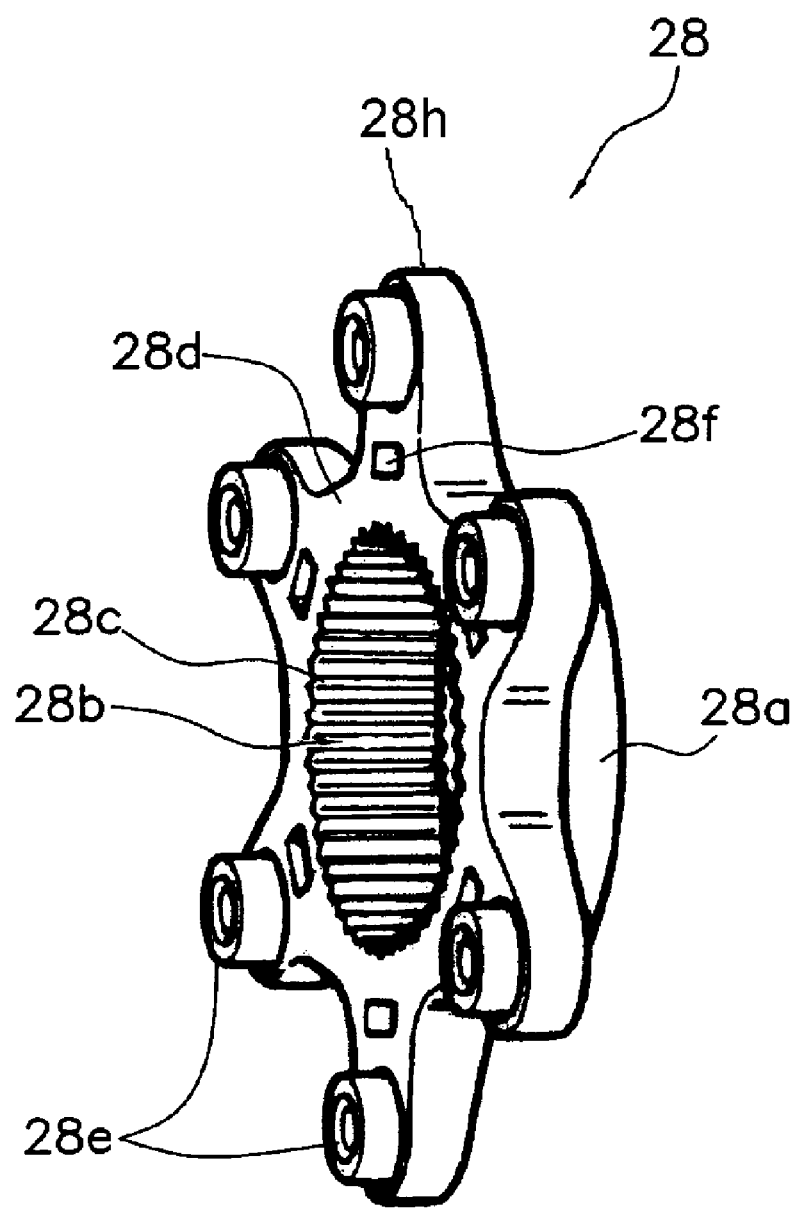
FIG. 6 is a more detailed view of the rotor attachment boss shown in FIG. 4.
Figure 11:
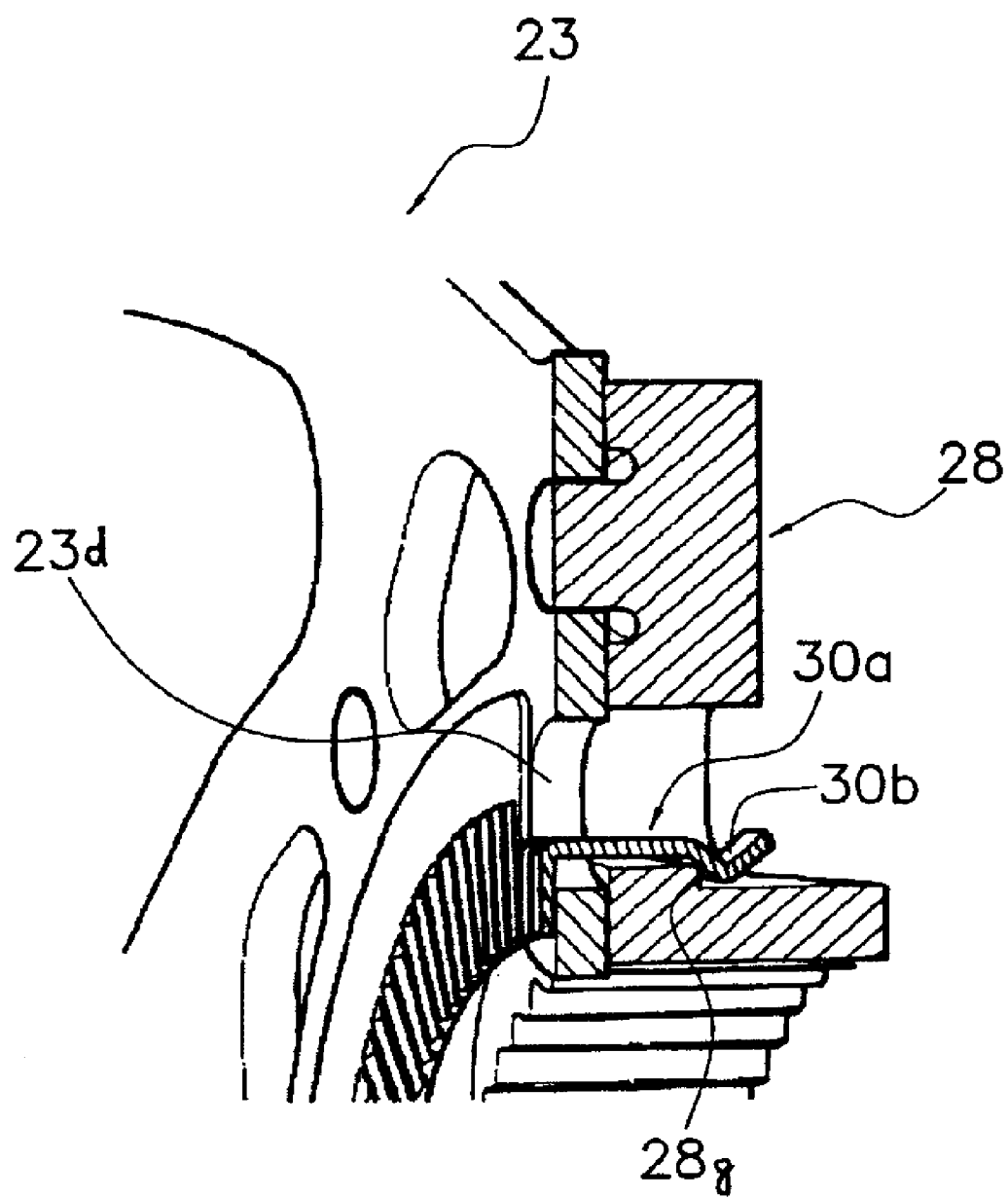
FIG. 11 is a more detailed view showing the attachment of the disk brake rotor to the rotor attachment boss.

As shown in FIG. 6, rotor attachment boss 28 comprises an annular base member 28*a* with a center opening 28*b*, wherein the inner peripheral surface of center opening 28*b* defines a plurality of female splines 28*c*. Splines 28*c* are structured to engage the plurality of splines 34*c* on brake rotor attachment unit 34 of hub 12 so that rotor attachment boss 28 can be nonrotatably attached to hub 12. Rotor attachment boss 28 further comprises a rotor connector 28*d* that extends radially outwardly from base member 28*a* and defines a plurality of equally spaced rotor attachment arms 28*h*. Each rotor attachment arm 28*h* preferably includes at least one axially extending protruding portion 28*e* and at least one insertion opening 28*f* for purposes discussed below. As shown in FIG. 11, each insertion opening 28*f* defines a radially extending step 28*g* that forms a latching structure. In this embodiment, rotor attachment boss 28 comprises aluminum.

Figure 7:
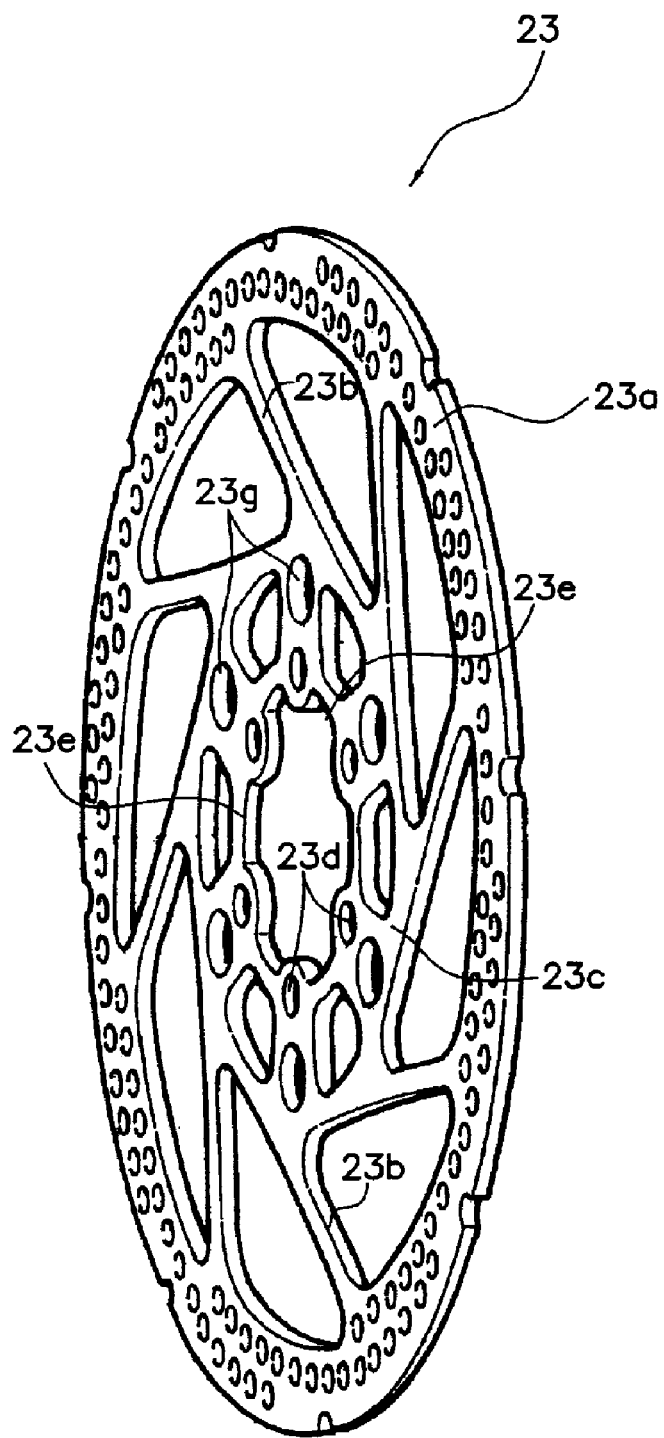
FIG. 7 is a more detailed view of the disk brake rotor shown in FIG. 4.

As shown in FIG. 7, disk brake rotor 23 comprises a braking ring 23*a* formed with a plurality of openings, a plurality of (e.g., eight) connecting arms 23*b* disposed circumferentially equidistant and extending radially inwardly from braking ring 23*a*, and an inner attachment unit 23*c* connected tangentially to the inner ends of the plurality of connecting arms 23*b* so that the plurality of connecting arms 23*b* form a plurality of triangular openings. In this embodiment, braking ring 23*a*, the plurality of connecting arms 23*b* and inner attachment unit 23*c* are one piece. Disk brake rotor 23 preferably is made from stainless steel or some other appropriate material, usually with a specific gravity greater than that of the material forming rotor attachment boss 28, that can withstand braking forces.

Inner attachment unit 23*c* comprises a plurality of circumferentially equidistant insertion openings 23*d*, preferably one per insertion opening 28*f* in rotor attachment boss 28, a plurality of (e.g., six) circumferentially equidistant connection notches 23*e*, and a plurality of circumferentially equidistant connection openings 23*g*, preferably one per protruding portion 28*e* in rotor attachment boss 28. Each protruding portion 28*e* in rotor attachment boss 28 engages a corresponding connection opening 23*g* in inner attachment unit 23*c* so that disk brake rotor 23 may be nonrotatably attached to rotor attachment boss 28. The axial length of each protruding portion 28*e* preferably is less than or equal to the thickness of inner attachment unit 23*c*.

Figure 8:
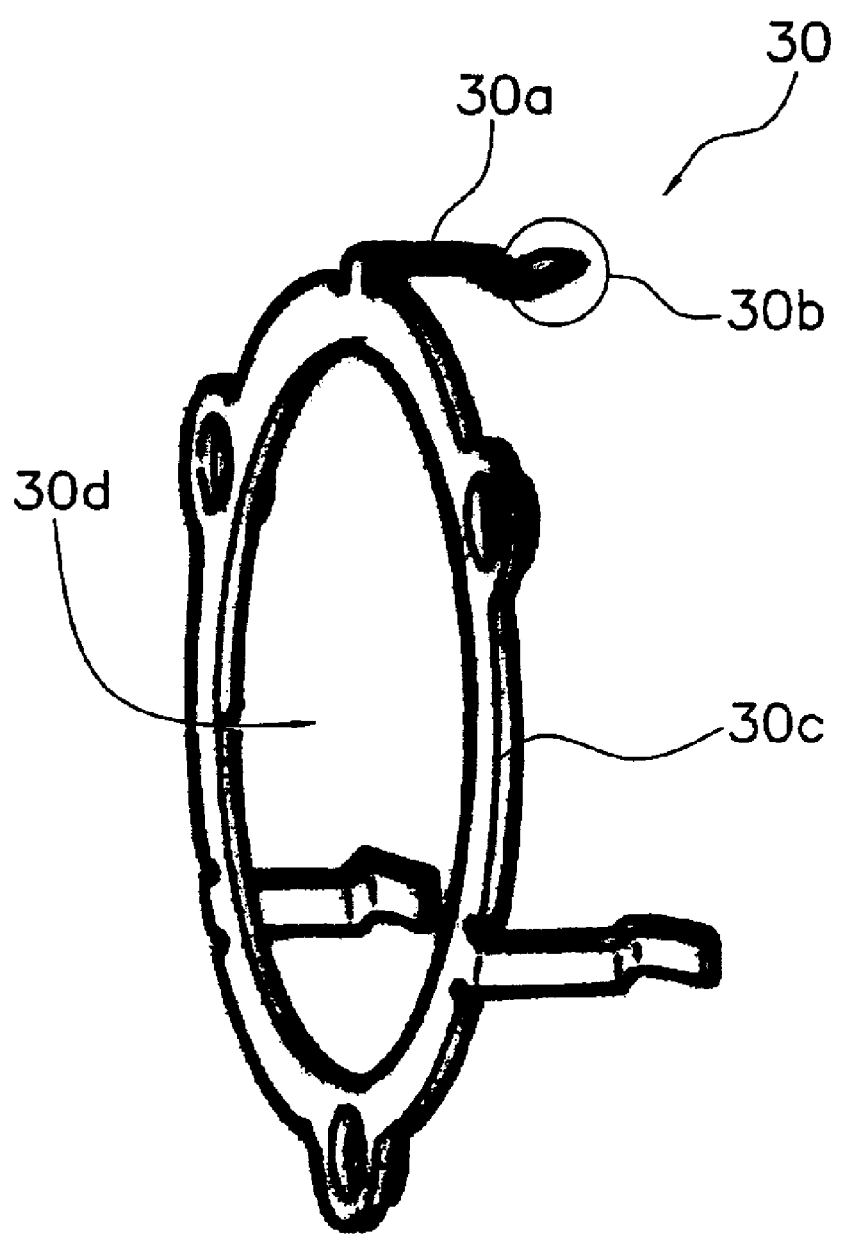
FIG. 8 is a more detailed view of the rotor retaining member in FIG. 4.

As shown in FIG. 8, rotor retaining member 30 comprises an annular disk-shaped main body 30*c* with a central opening 30*d* and a plurality of (e.g., three) elastically deformable latching members 30*a* extending perpendicularly from a lateral side face of main body 30*c*. Each latching member 30*a* includes a radially inwardly curved protruding portion 30*b* at the tip thereof. Each protruding portion 30*b* is structured to engage the step 28*g* in a corresponding insertion opening 28*f* of rotor attachment boss 28 when rotor retaining member 30 is attached to rotor attachment boss 28.

Figure 9:
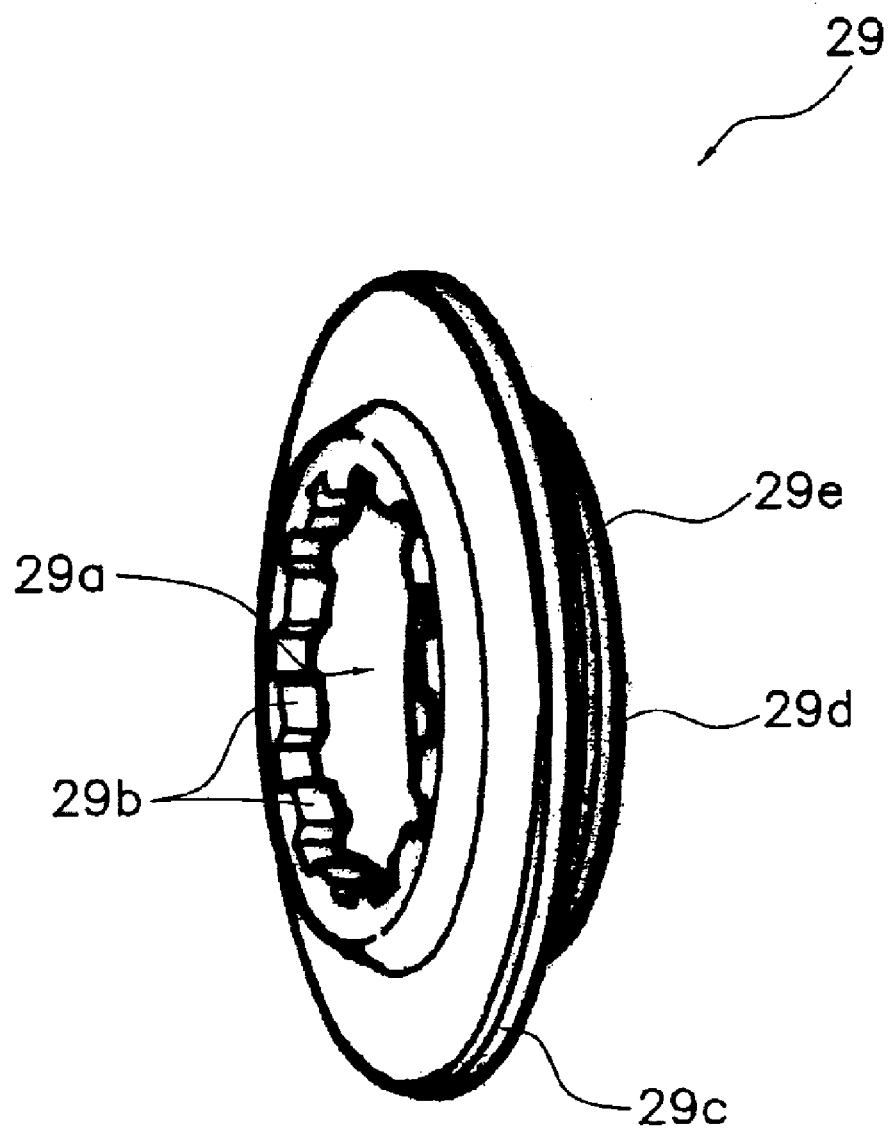
FIG. 9 is a more detailed view of the securing ring shown in FIG. 4.

As shown in FIG. 9, securing ring 29 comprises an annular flange 29*c* and a tubular portion 29*d* that extends axially from the inner peripheral surface of flange 29*c*. Flange 29*c* includes a central opening 29*a* defining a plurality of female splines 29*b* that are structured to engage an assembly tool (not shown). Tubular portion 29*d* includes a male threaded portion 29*e* structured to engage the female threaded portion 34*d* on brake rotor attachment unit 34 of hub 12. Thus, when securing ring 29 is screwed into brake rotor attachment unit 34, the side face of flange 29*c* presses against main body 30*c* of rotor retaining member 30, which presses against inner attachment unit 23*c* of disk brake rotor 23, which presses against flange 34*b* of brake rotor attachment unit 34 of hub 12.

Figure 10:
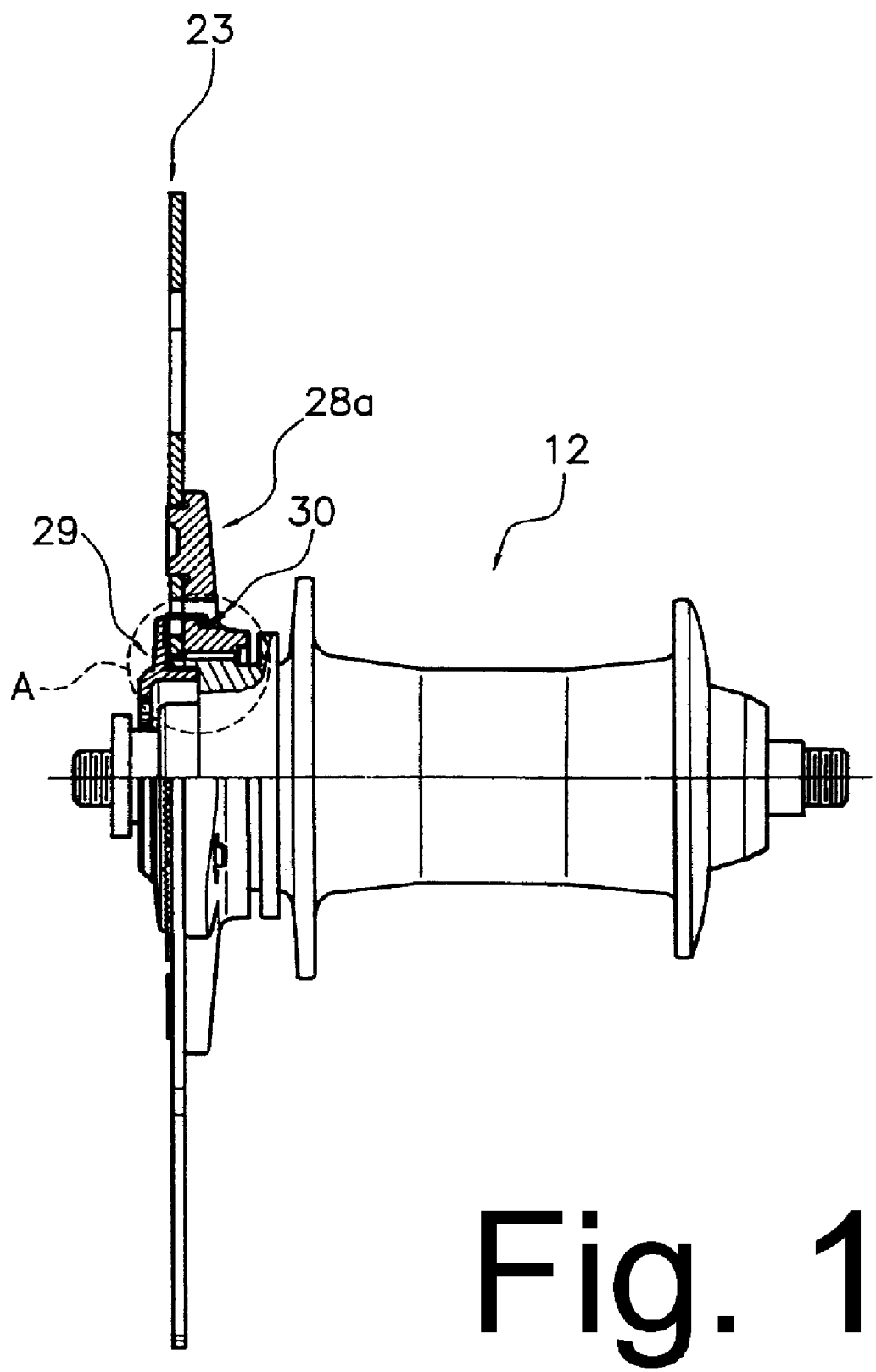
FIG. 10 is a view of the disk brake rotor attached to the wheel hub.

FIG. 10 is a view of disk brake rotor assembly 8 attached to hub 12, and FIG. 11 is a more detailed view showing how rotor retaining member 30 retains disk brake rotor 23 to rotor attachment boss 28. Initially, rotor attachment boss 28 is mounted to brake rotor attachment unit 34 of hub 12 by engaging the male splines 34*c* on brake rotor attachment unit 34 with the female splines 28*c* on rotor attachment boss 28. Then, disk brake rotor 23 is placed on rotor attachment boss 28 by engaging protruding portions 28*e* of rotor attachment boss 28 with the corresponding connection openings 23*g* in disk brake rotor 23. At this time, insertion openings 23*d* in disk brake rotor 23 align with insertion openings 28*f* in rotor attachment boss 28.

Latching members 30*a* of rotor retaining member 30 then are inserted through insertion openings 23*d* in disk brake rotor 23 and into insertion openings 28*f* in rotor attachment boss 28. Latching members 30*a* deflect radially outwardly until protruding portions 30*b* move radially inwardly to latch onto corresponding steps 28*g* in insertion openings 28*f*. As a result, disk brake rotor 23 is retained to rotor attachment boss 28 simply by a single touch pressing operation on rotor retaining member 30. Attaching and tightening bolts are not required, thus greatly simplifying the manufacturing operation and enhancing production efficiency.

Finally, securing ring 29 is screwed into the female threaded portion 34*d* of brake rotor attachment unit 34 of hub 12 to tightly secure disk brake rotor assembly 8 to hub 12. The disk brake rotor 23, sandwiched between rotor attachment boss 28 and securing ring 29 to form a strong connection, is thereby secured in a non-rotatable state to the brake rotor attachment unit 34 of hub 12.

When one desires to disassemble disk brake rotor assembly 8, the stopper 30 is simply pulled in the direction opposite the direction of connection. The latching members 30*a* then deflect radially outwardly, and the curved portions 30*b* of latching members 30*a* disengage from the steps 28*g* formed in the insertion openings 28*f* of rotor attachment boss 28. Latching members 30*a* then may be pulled from insertion openings 28*f* of rotor attachment boss 28 and from insertion openings 23*d* of disk brake rotor 23, disk brake rotor 23 may be removed from rotor attachment boss 28, and rotor attachment boss 28 may be removed from brake rotor attachment unit 34 of hub 12.

While the above is a description of various embodiments of inventive features, further modifications may be employed without departing from the spirit and scope of the present invention. For example, disk brake rotor 23 need not be sandwiched between rotor retaining member 30 and brake rotor attachment unit 34. Instead, rotor retaining member 30 could be inserted from the right side through insertion openings 28f in rotor attachment boss 28, through insertion openings 23d in disk brake rotor 23, and latch onto the side surface of disk brake rotor 23. Securing ring 29 may be omitted in some applications. The teachings herein could be applied to one or both of hubs 12 and 12'.

Figure 12:
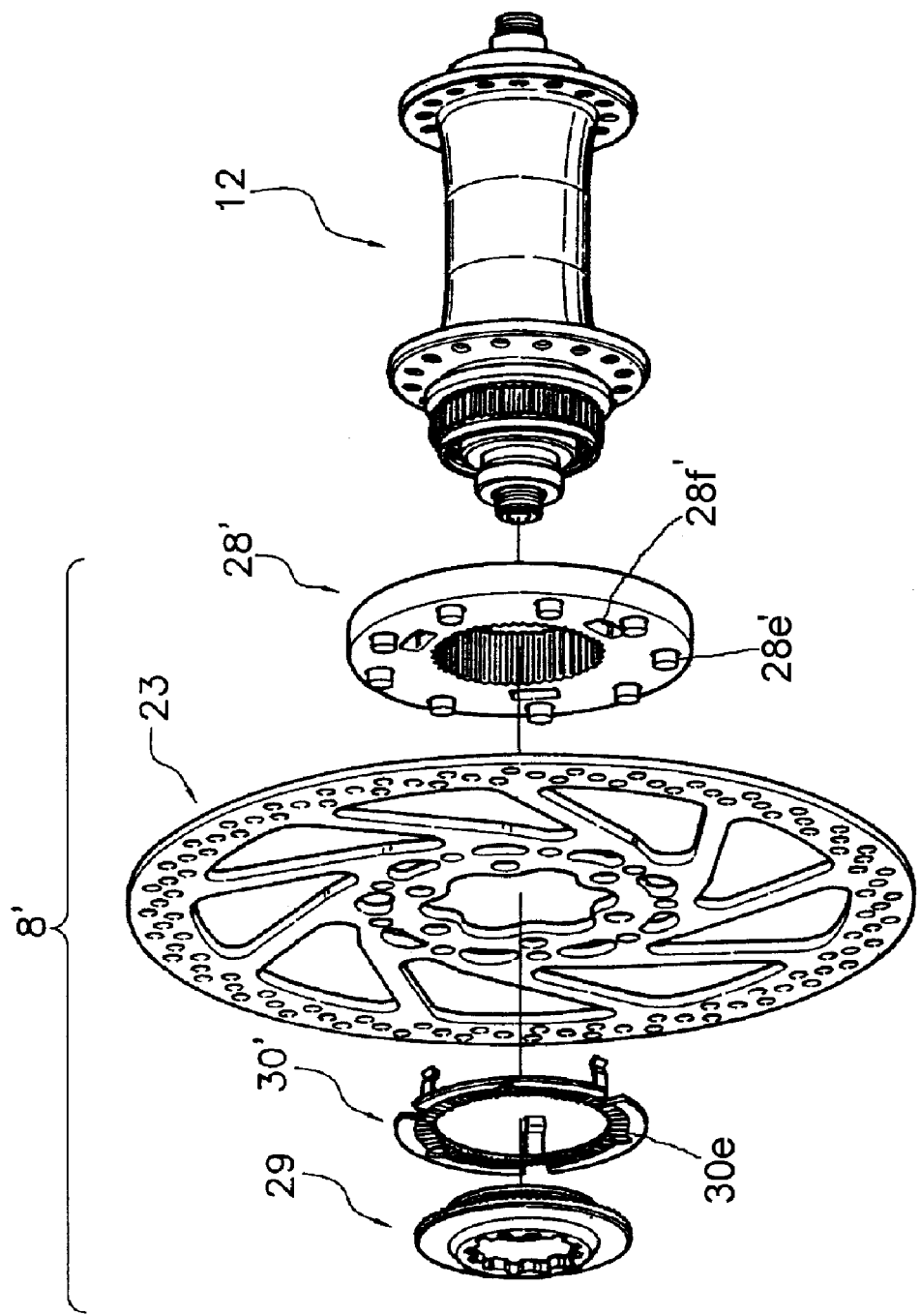
FIG. 12 is an exploded view of further embodiments of disk brake components associated with a wheel hub.

As shown in the disk brake rotor assembly 8' illustrated in FIG. 12, it is also possible to form serrations 30e on the side surface of a rotor retaining member 30' facing securing ring 29 to inhibit loosening of securing ring 29 due to vibration or the like. Also, a simple annular rotor attachment boss 28' with protruding portions 28e' and insertion openings 28f' could be provided.

Figure 13:
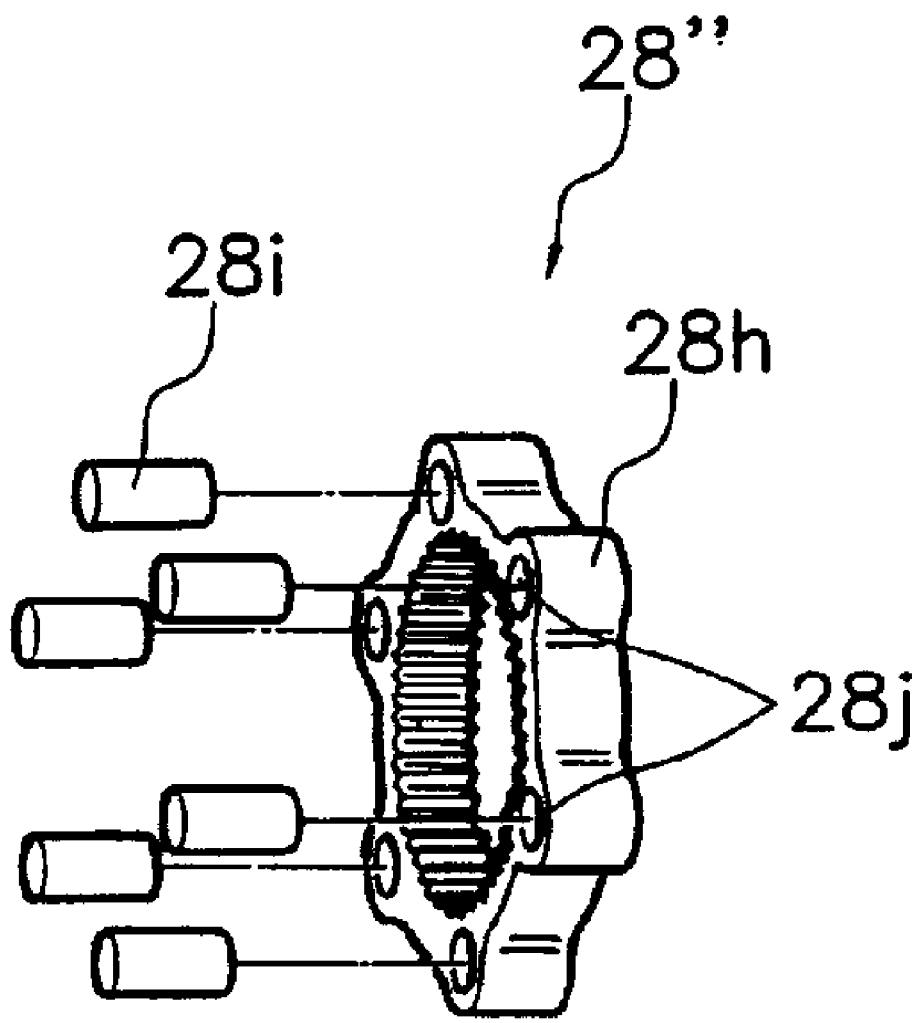
FIG. 13 is an exploded view of another embodiment of a rotor attachment boss.

As shown in FIG. 13, a rotor attachment boss adapter 28" could be provided, wherein separately formed pins 28i are press fit into openings 28j formed in an annular main body 28h with an undulating outer peripheral surface.

The size, shape, location or orientation of the various components may be changed as desired. Components that are shown directly connected or contacting each other may have intermediate structures disposed between them. Those features that are designated as preferable certainly are not necessary. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. An apparatus for fixing a bicycle disk brake rotor to a bicycle wheel hub, wherein the apparatus comprises:
   an adapter structured to be nonrotatably coupled to the bicycle wheel hub and to nonrotatably support a disk brake rotor, wherein the adapter includes at least one insertion opening; and
   a rotor retaining member with a latching member structured to be inserted into the insertion opening in the adapter to retain the disk brake rotor to the adapter in an axial direction;
   wherein the latching member detachably locks the disk brake rotor to the adapter in the axial direction.

2. The apparatus according to claim 1 wherein the rotor retaining member is structured to support the disk brake rotor between the rotor retaining member and the adapter.

3. The apparatus according to claim 1 wherein the latching member is structured to removably latch the rotor retaining member to the adapter.

4. The apparatus according to claim 1 further comprising a fastener structured to fasten the rotor retaining member to the bicycle wheel hub.

5. The apparatus according to claim 1 wherein the rotor retaining member comprises an annular main body, wherein the latching member extends from the main body.

6. The apparatus according to claim 5 wherein the latching member extends perpendicularly from a lateral side face of the main body.

7. The apparatus according to claim 5 wherein the latching member has a protruding portion that protrudes radially relative to the latching member.

8. The apparatus according to claim 7 wherein the adapter includes a latching structure that engages the protruding portion of the latching member.

9. The apparatus according to claim 8 wherein the latching structure is disposed in close proximity to the insertion opening.

10. The apparatus according to claim 9 wherein the latching structure is disposed in the insertion opening.

11. The apparatus according to claim 5 wherein the rotor retaining member comprises a plurality of the latching members.

12. The apparatus according to claim 11 wherein the rotor retaining member comprises three latching members.

13. The apparatus according to claim 1 wherein the adapter includes a protruding portion structured to be inserted into the disk brake rotor to prevent relative rotation between the adapter and the disk brake rotor.

14. The apparatus according to claim 13 wherein the adapter includes a plurality of the protruding portions structured to be inserted into the disk brake rotor to nonrotatably support the disk brake rotor to the adapter.

15. The apparatus according to claim 1 wherein the adapter comprises an annular member.

16. The apparatus according to claim 15 further comprising a plurality of attachment arms extending radially outwardly from the annular member.

17. The apparatus according to claim 15 wherein the adapter further comprises a plurality of protruding portions extending from a lateral side surface of the annular member.

18. The apparatus according to claim 17 wherein the adapter includes a plurality of the insertion openings disposed radially inwardly from the plurality of protruding portions.

19. The apparatus according to claim 1 wherein the latching member is structured so that the disk brake rotor is detached from the adapter by pulling the rotor retaining member in the axial direction.

20. An apparatus for fixing a bicycle disk brake rotor to a bicycle wheel hub, wherein the apparatus comprises:
    an adapter structured to be nonrotatably coupled to the bicycle wheel hub and to nonrotatably support a disk brake rotor, wherein the adapter includes at least one insertion opening; and
    a rotor retaining member with a latching member structured to be inserted into the insertion opening in the adapter to retain the disk brake rotor to the adapter in an axial direction;
    wherein the latching member comprises an elastically deformable member.

21. An apparatus for fixing a bicycle disk brake rotor to a bicycle wheel hub, wherein the apparatus comprises:
    an adapter comprising an annular member structured to be nonrotatably coupled to the bicycle wheel hub and to nonrotatably support a disk brake rotor, wherein the adapter includes at least one insertion opening;
    a plurality of attachment arms extending radially outwardly from the annular member; and a rotor retaining member with a latching member structured to be inserted into the insertion opening in the adapter to retain the disk brake rotor to the adapter in an axial direction;

wherein each of the plurality of attachment arms includes a protruding portion structured to be inserted into the disk brake rotor.

22. The apparatus according to claim 21 wherein the adapter includes a plurality of the insertion openings, each insertion opening being disposed in close proximity to a corresponding one of the plurality of attachment arms.

23. The apparatus according to claim 22 wherein each insertion opening is disposed radially inwardly from the protruding portion of the corresponding attachment arm.

* * * * *